US009287935B2

(12) United States Patent
Buckley et al.

(10) Patent No.: US 9,287,935 B2
(45) Date of Patent: Mar. 15, 2016

(54) METHOD AND APPARATUS FOR ANTI-EAVESDROPPING IN VUNERABLE NFC APPLICATIONS

(71) Applicant: BlackBerry Limited, Waterloo (CA)

(72) Inventors: Michael Eoin Buckley, Grayslake, IL (US); Shirook M. Ali, Milton (CA)

(73) Assignee: BlackBerry Limited, Waterloo, Ontario (CA)

( * ) Notice: Subject to any disclaimer, the term of this patent is extended or adjusted under 35 U.S.C. 154(b) by 73 days.

(21) Appl. No.: 13/957,123

(22) Filed: Aug. 1, 2013

(65) Prior Publication Data

US 2015/0038074 A1  Feb. 5, 2015

(51) Int. Cl.
| | |
|---|---|
| *H04B 5/00* | (2006.01) |
| *H04B 7/06* | (2006.01) |
| *H04L 29/06* | (2006.01) |
| *H04W 4/00* | (2009.01) |
| *H04W 12/02* | (2009.01) |
| *H04W 12/12* | (2009.01) |

(52) U.S. Cl.
CPC ............ *H04B 5/0031* (2013.01); *H04B 7/0697* (2013.01); *H04L 63/1441* (2013.01); *H04L 63/162* (2013.01); *H04W 4/008* (2013.01); *H04W 12/02* (2013.01); *H04W 12/12* (2013.01)

(58) Field of Classification Search
CPC ..... H04W 4/008; H04W 12/06; H04W 12/08; H04W 4/00; H04W 4/12
USPC ............ 455/41.1, 41.2, 552.1, 406, 442, 503, 455/431
See application file for complete search history.

(56) References Cited

U.S. PATENT DOCUMENTS

| | | | | |
|---|---|---|---|---|
| 7,030,761 | B2* | 4/2006 | Bridgelall et al. | 340/572.2 |
| 7,668,565 | B2* | 2/2010 | Ylanen et al. | 455/553.1 |
| 7,778,603 | B2* | 8/2010 | Palin et al. | 455/41.2 |

(Continued)

FOREIGN PATENT DOCUMENTS

EP          2613454          7/2013

OTHER PUBLICATIONS

Extended European Search Report issued in European Application No. 14179592.2 on Jan. 30, 2015, 5 pages.

(Continued)

*Primary Examiner* — Marceau Milord
(74) *Attorney, Agent, or Firm* — Fish & Richardson P.C.

(57) ABSTRACT

A system and method may dynamically (a) adjust signal characteristics of individual portions of a Near Field Communication ("NFC") transmission, and/or (b) change NFC wireless communication channels. A transmitting device may transmit to a receiving device via multiple NFC channels. For instance, a transmitting device may have multiple spatially-separated antennas and/or transmitters, and a transmission required to complete a financial transaction (or other wireless communication) with a receiving device may have several portions. Each transmission portion may be sequentially and/or individually transmitted from the transmitting device to the receiving device using a different antenna and/or transmitter, i.e., a different communication channel. Each channel may use (1) a different antenna and/or transmitter located on the transmitting device, and/or (2) a different level or setting of a signal characteristic, such as transmit at a different power level, phase, frequency, or other characteristic than other channels. As a result, eavesdropping may be inhibited.

19 Claims, 8 Drawing Sheets

(56) References Cited

U.S. PATENT DOCUMENTS

| | | | | |
|---|---|---|---|---|
| 8,060,449 B1* | 11/2011 | Zhu | | 705/75 |
| 8,095,113 B2* | 1/2012 | Kean et al. | | 455/410 |
| 8,118,223 B2* | 2/2012 | Hammad et al. | | 235/384 |
| 8,126,806 B1 | 2/2012 | DiMartino et al. | | |
| 8,196,131 B1* | 6/2012 | von Behren et al. | | 717/168 |
| 8,244,169 B1* | 8/2012 | DiMartino et al. | | 455/1 |
| 8,249,935 B1* | 8/2012 | DiMartino et al. | | 705/16 |
| 8,297,520 B1* | 10/2012 | Wakerly et al. | | 235/492 |
| 8,350,668 B2* | 1/2013 | Busch-Sorensen | | 340/5.61 |
| 8,358,613 B1 | 1/2013 | Giallorenzi et al. | | |
| 8,522,019 B2* | 8/2013 | Michaelis | | 713/168 |
| 8,526,880 B2* | 9/2013 | Foster | | 455/41.1 |
| 8,606,720 B1* | 12/2013 | Baker et al. | | 705/76 |
| 8,670,714 B2* | 3/2014 | Marcovecchio et al. | | 455/41.2 |
| 8,687,536 B2* | 4/2014 | Michaelis | | 370/312 |
| 8,706,588 B1* | 4/2014 | Zhu | | 705/35 |
| 8,712,325 B2* | 4/2014 | Leica et al. | | 455/41.1 |
| 8,718,626 B2* | 5/2014 | Rose et al. | | 455/416 |
| 8,862,129 B2* | 10/2014 | Moshir et al. | | 455/435.1 |
| 8,880,055 B1* | 11/2014 | Clement et al. | | 455/420 |
| 8,880,100 B2* | 11/2014 | Dobyns | | 455/456.3 |
| 8,891,594 B2* | 11/2014 | Maguire | | 375/219 |
| 8,965,281 B2* | 2/2015 | Raisanen et al. | | 455/41.2 |
| 2010/0094752 A1* | 4/2010 | Heath | | 705/40 |
| 2010/0184450 A1* | 7/2010 | Chen et al. | | 455/455 |
| 2010/0311326 A1 | 12/2010 | Klabunde et al. | | |
| 2012/0278192 A1* | 11/2012 | Shirron et al. | | 705/26.1 |
| 2012/0322372 A1 | 12/2012 | Hansen et al. | | |
| 2013/0017780 A1 | 1/2013 | Rose et al. | | |
| 2013/0130614 A1* | 5/2013 | Busch-Sorensen | | 455/1 |
| 2013/0132282 A1 | 5/2013 | Shakkarwar | | |
| 2013/0162594 A1 | 6/2013 | Paulsen et al. | | |
| 2013/0266141 A1* | 10/2013 | Kim et al. | | 380/270 |
| 2013/0301497 A1* | 11/2013 | Gonikberg et al. | | 370/311 |
| 2013/0308562 A1* | 11/2013 | Matin et al. | | 370/329 |
| 2014/0025577 A1* | 1/2014 | Lisznianski | | 705/44 |
| 2014/0130151 A1* | 5/2014 | Krishnamurthy et al. | | 726/22 |
| 2014/0241179 A1* | 8/2014 | Arulprakasam et al. | | 370/252 |

OTHER PUBLICATIONS

Lakshmanan et al.; "Aegis: Physical Space Security for Wireless Networks with Smart Antennas," IEEE/ACM Transactions on Networking, 18:4, 1105-1118, Aug. 1, 2010.

* cited by examiner

METHOD AND APPARATUS FOR ANTI-EAVESDROPPING IN VUNERABLE NFC APPLICATIONS

FIELD

The present embodiments relate generally to Near Field Communication ("NFC"). More particularly, the present embodiments relate to inhibiting, hindering, and/or preventing eavesdropping on NFC applications.

BACKGROUND

Near Field Communication ("NFC") is a short-range wireless communication technology that is being developed for interactive use in consumer electronics, mobile devices, etc. One NFC application is the eWallet®, where electronic payments may be completed via a mobile device operating in conjunction with a merchant computing device using NFC techniques. In other words, NFC-enabled mobile devices may replace credit cards, payment or debit cards, and/or electronic key cards.

General examples of NFC techniques include peer-to-peer data transfer, such as users bumping or touching two NFC-enabled phones together to exchange money, and wireless credit card payments using NFC. Specific exemplary NFC devices and techniques are disclosed, for example, by U.S. Pub. No. 2013/0017780; U.S. Pat. No. 8,126,806; U.S. Pub. No. 2010/0311326; U.S. Pub. No. 2012/0322372; U.S. Pub. No. 2013/0132282; and U.S. Pub. No. 2013/0162594, which are all incorporated by reference in their entireties herein.

However, conventional NFC devices and techniques may have various drawbacks, such as security, transmitter and receiver alignment, connectivity, eavesdropping, and/or other communication-related issues. The present embodiments may, inter alia, overcome these and other deficiencies.

BRIEF SUMMARY

The present embodiments disclose an apparatus and method that may dynamically adjust or change the characteristics of individual portions of a NFC transmission and/or NFC wireless communication channels. A transmission may be transmitted from a transmitting device to a receiving device via a number of NFC channels. For instance, a transmitting device may include multiple antennas and/or transmitters, and a transmission required to complete a financial-related transaction or other data exchange with a receiving device may be split into multiple portions. Each portion of the entire transmission may be sequentially and/or individually transmitted from the transmitting device to the receiving device over a different wireless communication channel. Each channel may use a different antenna (and/or transmitter) located on the transmitting device, and/or transmit at a different level or setting of a signal characteristic, such as at a different power level, amplitude, frequency, phase, etc. Once all of the portions of the entire transmission have been transmitted from the transmitting device to the receiving device, the financial-related transaction or other data exchange may be completed. By continuously changing which antenna (and/or transmitter) is transmitting, and/or the characteristics of the individual transmission portions being transmitted, the capability of an eavesdropper to lock into the phase and/or magnitude of the transmission may be reduced. As a result, the ability to decode a sniffed signal may be inhibited. The antenna (and/or transmitter) and the level or setting of the signal characteristic associated with a transmission portion may be randomly determined or pre-determined.

In one aspect, a mobile device or other wireless communication device capable of facilitating a financial-related transaction or other data exchange using close range communication, such as NFC, may be provided. Multiple antennas and/or transmitters may be mounted on the mobile device. A transmission of a plurality of transmission portions from the mobile device to a receiving device via the multiple antennas and/or transmitters may complete a financial-related transaction or other data exchange. Individual transmission portions may be sequentially and/or individually (such as simultaneously) transmitted (1) from different antennas and/or transmitters from among the multiple antennas and/or transmitters, respectively, and/or (2) with different levels/settings of one or more signal characteristic (such as different power level, amplitude, frequency, phase, length of transmission, length of transmission time, and/or other wireless signal characteristics), to facilitate completing the financial-related transaction or other data exchange in a secure manner. Each of the plurality of transmission portions may be a segment of a complete transmission or message.

In another aspect, a mobile device or other wireless communication device capable of facilitating a financial-related transaction or other data exchange using close range communication, such as NFC, may be provided. A plurality of spatially-separated antennas (and/or transmitters) may be mounted on the mobile device. A transmission of a complete message or wireless communication from the mobile device to a receiving device that executes the financial-related transaction or other data exchange may be performed in parts or portions by random alteration or operation of individual antennas (and/or transmitters) from among the plurality of spatially-separated antennas (and/or transmitters) mounted on the mobile device. The individual antennas (and/or transmitters) may be activated in turn such that a spatial movement among the individual antennas (and/or transmitters) transmitting is simulated and secure transmission of the complete message or wireless communication is enhanced. Each portion of the complete message that is transmitted from a different one of the plurality of spatially-separated apart antennas (and/or transmitters) may be transmitted at a different value or setting of a signal characteristic than the adjacent-in-time (previous and/or subsequent) portion(s) of the complete message. The intended receiver may not see any difference, or any substantial difference, in the received signals due to the random variations in the signals since it is very close to the transmitting device. However, a malicious receiver may see non-trivial differences in the signals if it is sufficiently far away from the transmitting device.

In another aspect, a method of dynamically changing the individual NFC channels, and/or characteristics thereof, associated with a complete NFC transmission between wireless communication devices may be provided. The method may include: (a) generating a transmission that consists of several portions (each of which may vary as discussed herein), and/or dividing a NFC transmission into a number of transmission portions, at a transmitting device; (b) transmitting an initial transmission portion from the transmitting device: (1) from a first antenna and/or transmitter that is mounted on the transmitting device, and/or (2) at a first level or setting of a signal characteristic; and/or (c) transmitting a second transmission portion from the transmitting device: (3) from a second antenna and/or transmitter that is mounted on the transmitting device, the second antenna and/or transmitter being spatially-separated from the first antenna and/or transmitter, and (4) at a second level or setting of the signal characteristic, the second level or setting being different than the first level or setting. As a result, eavesdropping on the NFC transmission may be inhibited.

Advantages will become more apparent to those skilled in the art from the following description of the preferred embodiments which have been shown and described by way of illustration. As will be realized, the present embodiments are capable of other and different embodiments, and their details are capable of modification in various respects. Accordingly, the drawings and description are to be regarded as illustrative in nature and not as restrictive.

BRIEF DESCRIPTION OF THE DRAWINGS

There are shown in the drawings arrangements which are presently discussed, it being understood, however, that the present embodiments are not limited to the precise arrangements and instrumentalities shown, wherein.

DETAILED DESCRIPTION

The present embodiments relate to hindering or preventing eavesdropping attacks on NFC transmissions. A transmitting device may be NFC-enabled and include a plurality of antennas and/or transmitters. A transmission to be transmitted from the transmitting device to a receiving device may have several segments. Each segment may be individually and/or sequentially transmitted from the transmitting device to the receiving device using (1) a different antenna and/or transmitter located on the transmitting device; and/or (2) a different level or setting of a signal characteristic that is different than (i) adjacent-in-time or sequential transmission segments, and/or (ii) transmission segments simultaneously transmitted via other communication channels that are located spatially apart. As a result, the security of the transmission may be enhanced. The complete transmission may facilitate financial-related transactions, data exchanges (such as video, text, or audio data transfers or downloads), electronic messages (e.g. text or email), and/or other wireless communications between devices.

In general, the present embodiments propose using multiple antennas and/or transmitters which each may be activated in multiple ways. Each configuration of these antennas and/or transmitters may be un-noticeable to the desired receiver, but may cause a significant change in the signal received by any attacker, and thus prohibiting reception of the complete signal/transmission and potentially prohibiting phase and/or timing lock.

In one aspect, the present embodiments may relate to conducting or facilitating financial transactions via NFC and peer devices, as opposed to traditional credit card transactions. However, such financial transactions are subject to eavesdroppers that may be located nearby and intercepting financial information associated with a user of a mobile device. To alleviate these concerns, the present embodiments may provide a method and system that complete a financial transaction or other wireless communication using NFC via signals that are transmitted over separate antennas/transmitters and at different power levels (or other signal characteristics). By sending the transmission that completes the financial transaction over multiple randomly selected antennas/transmitters and at different power levels (or other signal characteristics), an eavesdropper may have difficult with time and/or phase synchronization while attempting to intercept. The antennas/transmitters may be ceramic-based or made front other material.

In one embodiment, the transmitting device may be a mobile device of a purchaser that may be NFC-enabled and include a plurality of antennas and/or transmitters. A financial-related transmission or message to be transmitted from the mobile device to a receiving device, such as a computing device of a merchant or a mobile device of another individual, may be broken up into a number of segments or portions. Each portion may be sequentially and/or individually transmitted from the transmitting device to the receiving device (1) from a different antenna and/or transmitter located on the transmitting device; and/or (2) at a different level, setting, or value of a signal characteristic than adjacent-in-time (previous and/or subsequent) transmission portions or transmission portions transmitted simultaneously, but on physically separated communication channels located spatially apart. As a result, the security of the financial transaction that is executed by the receiving device upon receipt of all of the transmission portions may be enhanced.

I. Conditions Impacting Eavesdropping

In general, security is an issue of concern in wireless communications. The short distances involved in NFC communications may not protect against eavesdropping because NFC is a wireless interface.

Eavesdropping may be when an attacker ("Eve") wants to listen to the wireless conversation between a first or transmitting party ("Alice") and a second or receiving party ("Bob") by sniffing part of the wireless signal shared between Alice and Bob. In general, with the attacker Eve using a well-designed antenna and receiver, she may be able to receive (sniff) signals: (a) within less than a meter in a passive mode, and/or (b) within a few meters in an active mode.

A number of conditions may impact successful eavesdropping. For instance, factors that may influence Eve's eavesdropping attempt may include: (a) characteristics of the attacker's antenna and receiver; (b) the quality of the attacker's RF (radio frequency) signal detector; (c) location (for good reception); (d) the power emitted by the NFC device (Alice); and/or (e) the attacker's channel characteristics, denoted herein by H(Alice, Eve).

Figure 1:
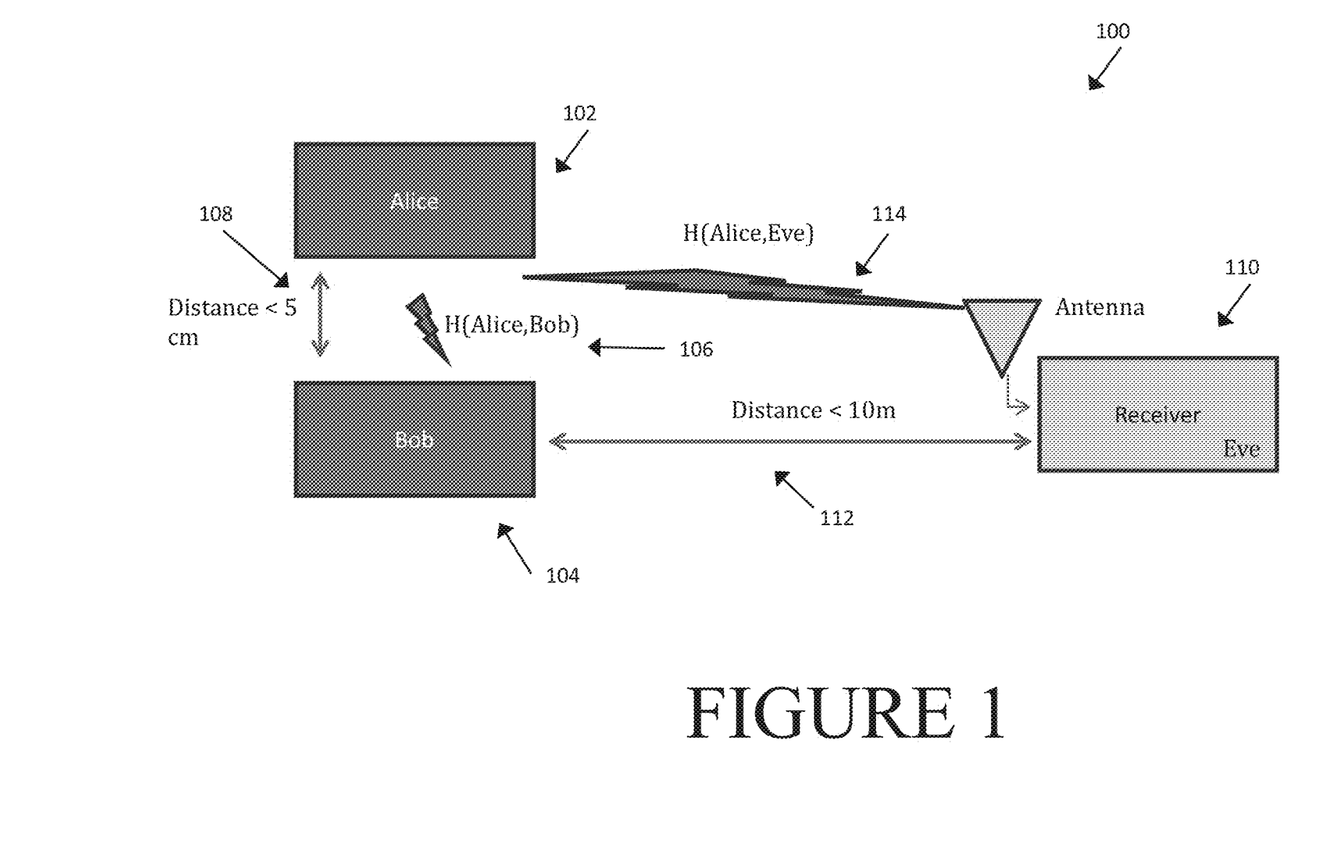
FIG. 1 illustrates an exemplary eavesdropping attack on a NFC transmission.

FIG. 1 illustrates an exemplary eavesdropping attack on a NFC transmission 100. A transmitting device (Alice) 102 may be in wireless communication with a receiving device (Bob) 104 over a channel 106 H(Alice, Bob). The distance 108 between Alice 102 and Bob 104 may be <5 cm. An eavesdropper (Eve) 110 may have an antenna and/or receiver and be at a second distance 112 from Alice 102 and/or Bob 104. The second distance 112 may be greater than the distance 108 between Alice 102 and Bob 104. The eavesdropper may try to sniff the wireless communication between Alice 102 and Bob 104 over communication channel 114 H(Alice, Eve). The factors listed above may influence whether or not the eavesdropping is successful, such as the power emitted by Alice 102 and/or the attacker Eve's 110 channel characteristics.

II. Anti-Eavesdropping Techniques

The present embodiments include methods and systems related to anti-eavesdropping techniques. The goal may be that at some time attacker Eve will be forced in a null reception and therefore cannot listen to all transmissions between Alice and Bob. This may be done by: (a) changing the characteristic of the channel between Alice and Eve, H(Alice, Eve); (b) changing the receive power levels and/or other receive signal characteristics as received by Eve; and/or (c) changing the capability to lock into the phase and/or the magnitude needed to decode the sniffed received signal. Eve may miss out on successfully intercepting all, or one or more specific, transmission portions from Alice and Bob, and thus may not be able to re-create or decipher the entire or portions of the transmission between Alice and Bob.

A communication between Alice and Bob may be completed through a number of spatially-spaced antennas and/or transmitters instead of via a single fixed antenna and/or transmitter with continuous power. Alice's signal may be split between the chosen antennas and/or transmitters. The power levels (or other settings or levels of signal characteristics) may be randomized within the set or a subset of the chosen antenna(s) and/or transmitter(s). The transmission from Alice may be performed by alteration of the antennas and/or transmitters being activated, thus simulating a spatial movement.

In an exemplary transaction, Alice's antennas' and/or transmitters' activation may be: (a) sequentially, i.e., one at a time using all antennas and/or transmitters (or all antenna/transmitter pairs); (b) sequentially, but using a subset of the antennas and/or transmitters (or subset of the antenna/transmitter pairs); and/or (c) sequential using all of the antennas and/or transmitters. Sequential using aft of the antennas and/or transmitters may include transmitting on all available antennas and/or transmitters (or antenna/transmitter pairs) at once (e.g., transmitting on 10 antennas/transmitter pairs at once), but continuously or periodically changing the power (or other signal characteristic level or setting) that each antenna is transmitting at. The choice of the antenna and/or transmitter to be active may be determined by: (1) a random generator algorithm, thus the next active antenna and/or transmitter may be decided randomly; (2) a fixed sequence that may be known or pre-determined; and/or (3) by other algorithm.

A. Sequentially Transmitting Via Individual Communication Channels

Noted above, the present embodiment may transmit portions of an entire transmission over individual communication channels each portion being communicated using separate antennas and/or transmitters physically located apart on the transmitting device). In one embodiment, the separate transmission portions may be transmitted sequentially in time, i.e., one at time.

Figure 2:
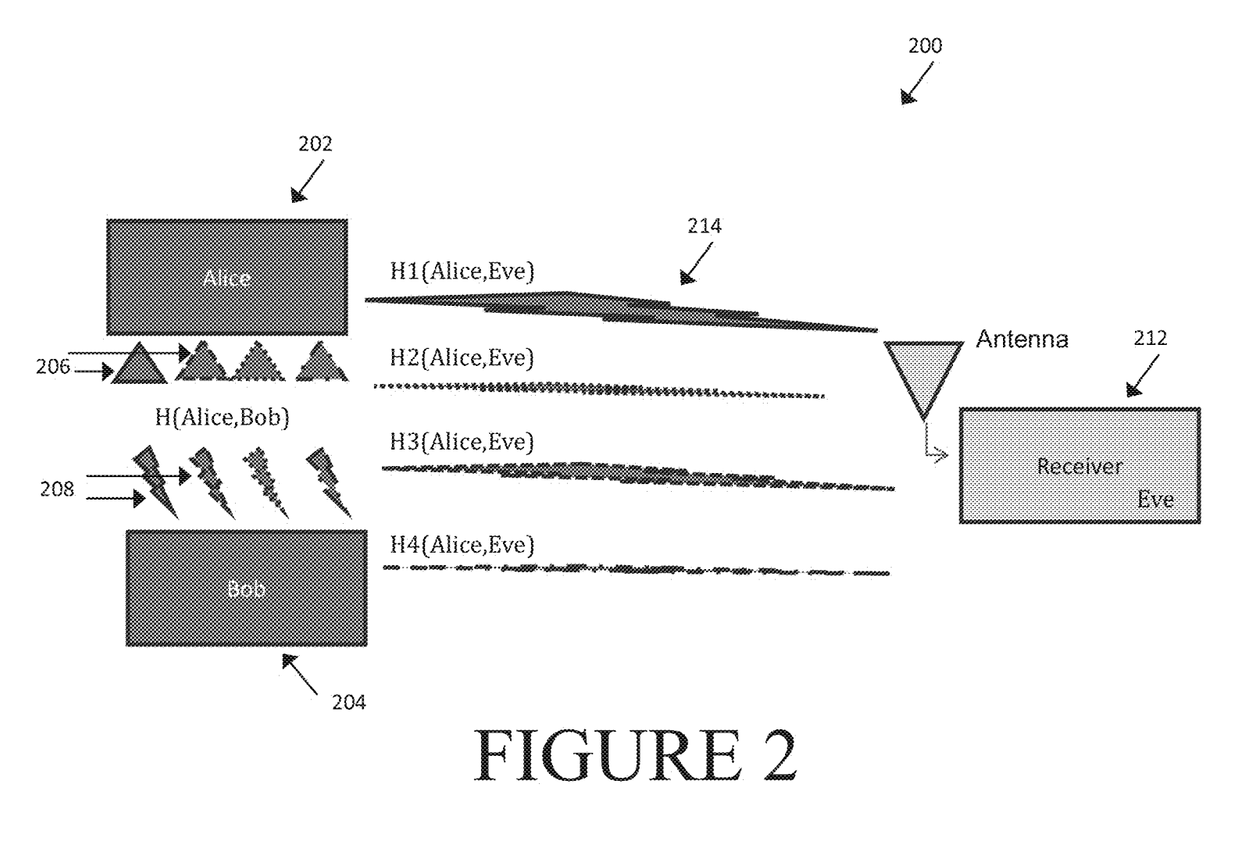
FIG. 2 illustrates an exemplary technique of hindering eavesdropping attacks of the present embodiments using multiple antennas and/or transmitters.

FIG. 2 illustrates an exemplary technique of hindering eavesdropping attacks using multiple antennas 200. A transmitting device (Alice) 202 may be in wireless communication with a receiving device (Bob) 204 over a number of channels 208 H(Alice, Bob). Each of the channels 208 may be associated with an individual antenna (and/or transmitter) 206 mounted spatially apart on the transmitting device 202. An eavesdropper (Eve) 212 may have an antenna and/or receiver. The eavesdropper may try to sniff the wireless communication between Alice 202 and Bob 204 over communication channels 214 H(Alice, Eve). Each communication channel 214 between Alice 202 and Eve 212 may correspond to individual antenna/channel pairs and/or channels 208 between Alice 202 and Bob 204. By dynamically changing the level or settings of one or more signal characteristics of the signals being transmitting from individual antennas (and/or transmitters) 206 spatially mounted apart on the transmitting device (Alice) 202, the eavesdropping capabilities of Eve 212 may be inhibited.

For the exemplary embodiment in which the power level of different transmission portions are dynamically altered, regardless of the antenna(s) (at Vor transmitter(s)) that Alice choses to transmit with, the active or transmitting channel between Alice and Bob (denoted as H(Alice, Bob)) may be mainly or approximately constant. However, the strength of the channels/power levels between Alice and Eve may depend upon the location of the active antenna. For instance, $eig\{H1(Alice,Eve)\} > eig\{H3(Alice,Eve)\} > eig\{H2(Alice,Eve)\} > eig\{H4(Alice,Eve)\}$—where eig is the Eigen value of the corresponding channel H. Thus, an eavesdropper may see a dynamically changing signal being transmitted over a number of communication channels, which may inhibit eavesdropping ability.

B. Simultaneously Transmitting Via Individual Communication Channels

Noted above, the present embodiment may transmit portions of an entire transmission over individual communication channels that are physically located apart. In one embodiment, all of or subset of the separate transmission portions may be transmitted simultaneously or all at once. Transmitting on multiple communication channels at the same time may also hinder eavesdropping attacks.

Referring to FIG. 2, the transmitting device (Alice) 202 may be in wireless communication with a receiving device (Bob) 204 over a number of channels 208 H(Alice, Bob). Alice 202 may transmit separate portions of a transmission across each channel 208, but simultaneously. For instance, Alice may transmit all or a subset of transmission portions at the same time. By periodically and/or dynamically changing the level or settings of one or more signal characteristics of the signals being simultaneously transmitted from individual antennas (and/or transmitters) spatially mounted apart on the transmitting device (Alice) 202, the eavesdropping capabilities of Eve 212 may be inhibited.

C. Inhibiting Constellation Mapping

Figure 3:
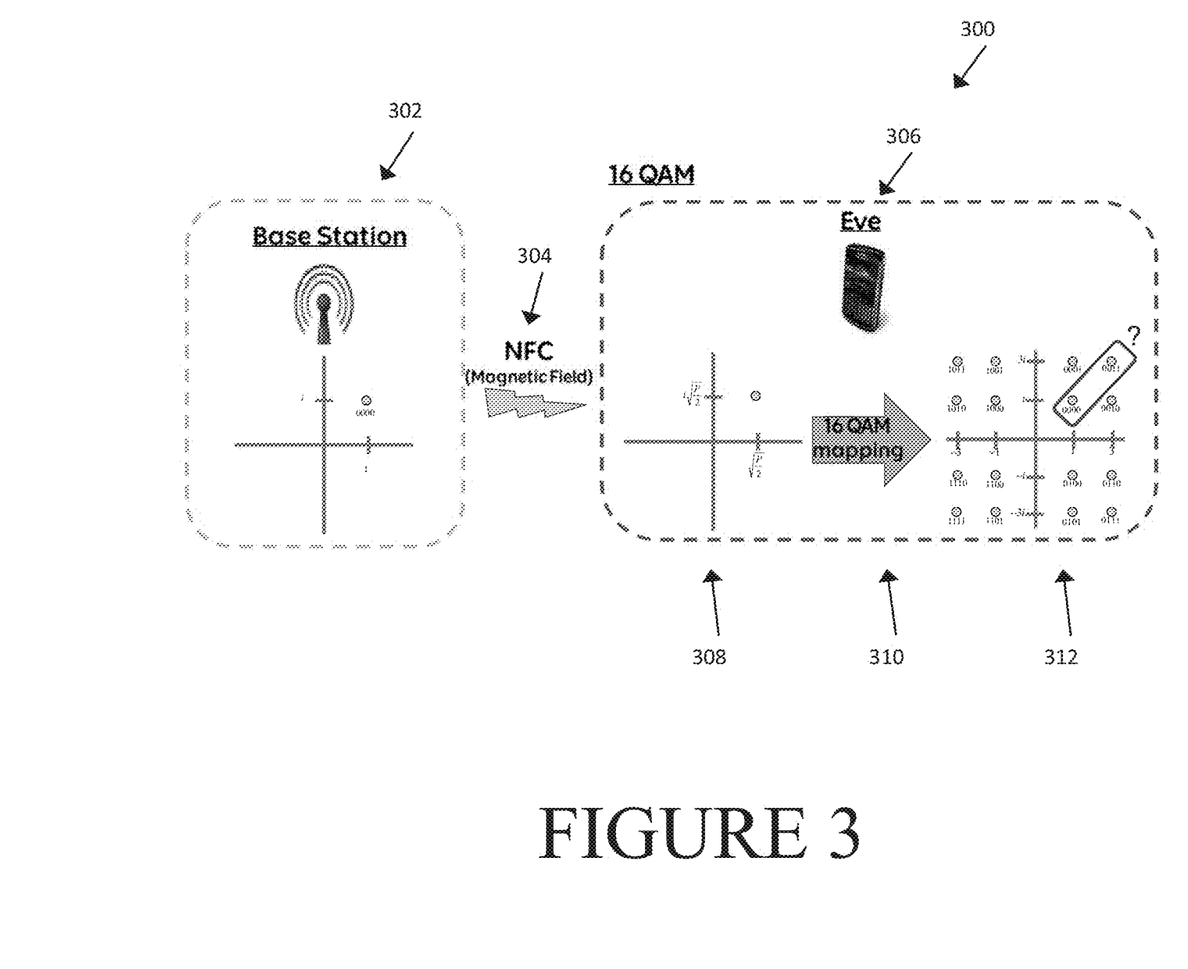
FIG. 3 depicts an exemplary technique of hindering eavesdropping attacks of the present embodiments using different levels of a signal characteristic among different communication channels, such as using multiple power levels.

The present embodiments may inhibit an eavesdropper's ability to successfully map a constellation of data or bits. For instance, FIG. 3 depicts an exemplary technique of hindering eavesdropping attacks of the present embodiments using multiple power levels 300.

Depicted are exemplary effects of Alice 302 transmitting NFC transmissions 304 at irregular power levels upon Eve 306. In the example shown, a base station's (Alice) 302 antennas are alternatively activated. Even if Eve 306 could synchronization with the signal 304, since the power various randomly, she is uncertain whether to map 310 the received symbol 308 to "0000" or "0011" 312. The example illustrated includes data transmitted using quadrature amplitude modulation (QAM). Transmission portions transmitted using other modulation techniques, and from different communication channels and/or with different signal characteristic levels or settings may also inhibit the ability of Eve to eavesdrop.

The impact of varying per antenna transmissions from Alice: (1) may have no noticeable impact upon communication between Alice and Bob; and/or (2) inhibit Eve's ability to (a) perform: (i) time synchronization lock with Alice's signal; (ii) phase synchronization lock with Alice's signal; and/or (iii) stable channel estimation; and/or (b) receive sufficient power of all portions of the signal.

D. Exemplary Antennas and/or Transmitters

Preferably, the plurality of spatially-spaced antennas and/or transmitters are spaced about a mobile device and made from a ceramic. Ceramic-based NFC antennas and/or transmitters may allow for small physical antenna size and flexible placement options necessary to support multiple antennas and/or transmitters in mobile devices. However, other spacing and/or materials, such as metal, may be used. It should be noted that the term "mobile device" herein may include smart phones, cell phones, NFC-enabled devices, user equipment ("UEs"), computing devices, computers, laptops, tablets, netbooks, notebooks, personal digital assistants (PDAs), handheld devices, and/or other wireless communication devices.

In one embodiment, NFC tags may be those developed by Toda Kogyo Corp. The tags may be very small and lightweight, and attachable in narrow spaces. The NFC tags may have multidirectional communication capabilities. The tags may include a ferrite antenna and/or transmitter, a loop antenna and a ferrite plate, and/or other configurations. The NFC tags may be 5×3 mm in size. Additional or alternate materials or sizes may be used.

The NFC tags, antennas, and/or transmitters may operate at 13.56 MHz and/or other frequencies. For instance, the NFC tags, antennas, and/or transmitters may operate at lower or higher frequencies. Any radio frequency (RF) signal may be used, such as radio frequencies of about 3 kHz to 300 GHz, including 800 MHz, 900 MHz, 1900 MHz, 2.4 GHz, 3.6 GHz, 4.9/5.0 GHz, 30 GHz, and 60-70 GHz bands. Other NFC tags, antennas and/or transmitters may be used.

E. Exemplary Dynamically Adjusted Signal Characteristics

Figure 4:
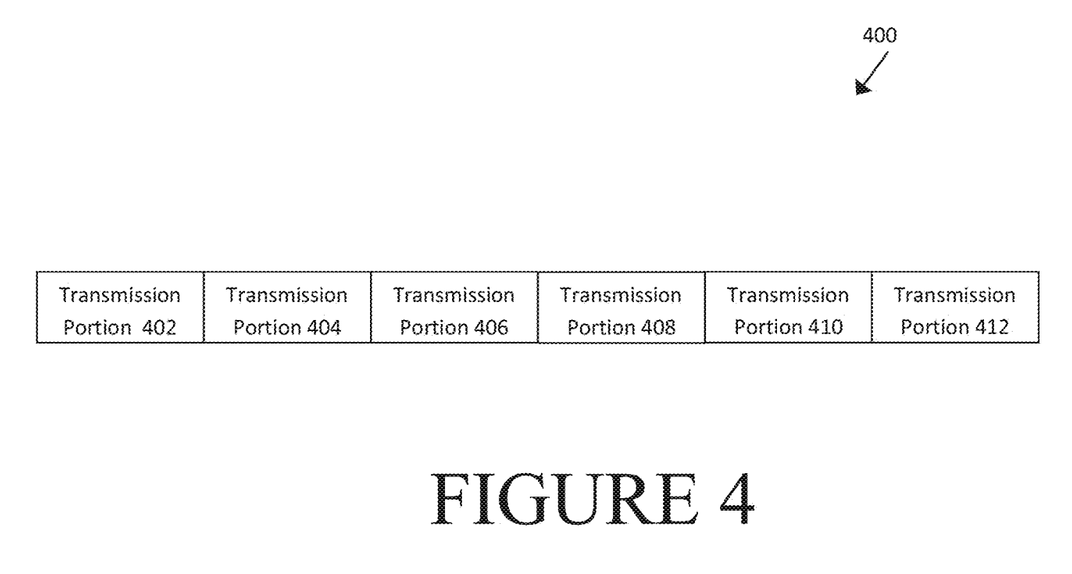
FIG. 4 illustrates an exemplary transmission broken up into transmission portions or segments having different signal characteristic levels/settings.

FIG. 4 illustrates an exemplary transmission or entire message 400 broken up into transmission portions or segments having different signal characteristics. A transmission 400 may include several transmission portions 402, 404, 406, 408, 410, and 412. Each transmission portion 402, 404, 406, 408, 410, and 412 may be transmitted having different characteristics than (a) adjacent-in-time transmitted portions; (b) portions transmitted from adjacent-in-space communication channels; (c) all of the other transmission portions; and/or (d) some of the other transmission portions.

For instance, if the sequential order of transmission timewise is transmission portion 402, then transmission portion 404, then transmission portion 406, etc., then transmission portion 404 may have a different level or setting of a signal characteristic that is different than the level or setting of the signal characteristic of either transmission portion 402 or transmission portion 406, or both.

If all or some of the transmission portions are transmitted simultaneously, those transmitted at the same time may have different levels or settings of a signal characteristic. For instance, if a mobile device has six antenna and/or transmitters, each transmission portion 402, 404, 406, 408, 410, and 412 may be transmitted at the same time hut at a different level or setting of one or more signal characteristics. If the transmission is long enough, each transmission portion 402, 404, 406, 408, 410, and 412 may be varied with respect to the level or setting of the one or more signal characteristics during transmission.

Each transmission portion 402, 404, 406, 408, 410, and 412 may or may not be transmitted from a different antenna and/or transmitter pair. For instance, if a mobile device has six or more antennas and/or transmitters, each transmission portion may be transmitted at the same time. However, if the mobile device has only four antennas and/or transmitters, only the first four transmission portions 402, 404, 406, 408 may be transmitted at once, while the remaining two transmission portions 410, 412 may be transmitted subsequently.

Each portion of the transmission that is transmitted from the individual antennas and/or transmitters may have a different level, amount, value, or setting of a signal characteristic that is different from all or some of the other portions of the transmission. The signal characteristics that may change may include differing power level, amplitude, frequency, phase, transmission length or data packet size, transmission time or other time-related parameter, or other signal or wavelength characteristic. For instance, varying power level and/or phase of sequentially transmitted transmission portions may inhibit eavesdropping attempts.

Other signal characteristics or changes to the transmission portions may be used, such as changing data-related parameters or setting. For instance, changes from transmission portion to transmission portion may include changes in data modulation, data packet length, encryption technique, length or time of transmission, data type, coding, or other transmission-related changes. As one example, varying modulation or transmission types may be used, such as frequency division multiple access (FDMA), orthogonal frequency division multiple access (OFDM), code division multiple access (CDMA), and/or time division multiple access (TDMA) techniques.

It should be noted that changing certain signal characteristics may not have a noticeable impact on the intended recipient's receiver's ability to properly receive the transmission portions, while changing other signal characteristics may require the transmitting device and receiving device to have a pre-determined sequence of signal characteristics levels or settings. For instance, changing power levels or phases of transmitted portions may not adversely impact reception by the intended recipient. On the other hand, changing frequency or using frequency hopping techniques may require a predetermined sequence of frequencies to be agreed upon by the transmitting device and the receiving device.

III. Exemplary Mobile Devices

In one aspect, a mobile device or other wireless communication device capable of facilitating or enabling a financial-related transaction or other data exchange using NFC may be provided. Multiple antennas and/or transmitters may be mounted on the mobile device. A transmission of a plurality of transmission portions from the mobile device to a receiving device via the multiple antennas and/or transmitters may complete a financial-related transaction or other data exchange. Separate transmission portions may be sequentially and/or individually transmitted (1) from different antennas and/or transmitters from among the multiple antennas and/or transmitters, respectively, and/or (2) having a different level or setting of one or more signal characteristics (such as different power level, amplitude, frequency, phase, transmission time or length, and/or other wireless signal characteristic), to facilitate completing the financial transaction in a secure manner. Each of the plurality of transmission portions may be a segment of a complete transmission or message. In addition to financial-related transactions, other types of transmission or message, such as data or file transfers or receipt of the entire transmission or message, such as data or file transfers or downloads (including photo, audio, or text exchanges), electronic messages (email or text), and/or other wireless communications and messages.

Figure 5:
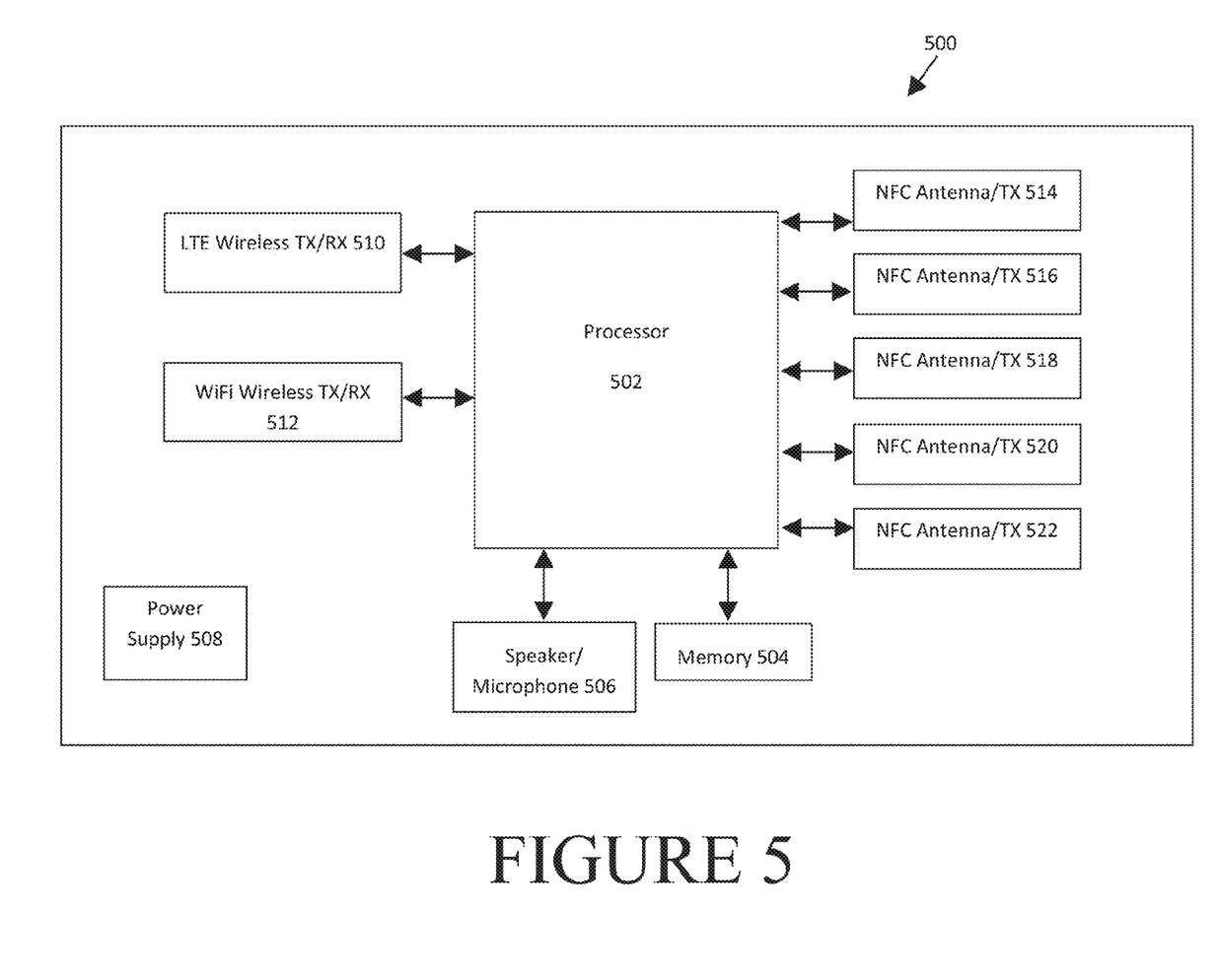
FIG. 5 illustrates an exemplary mobile device with multiple antennas and/or transmitters.

FIG. 5 illustrates an exemplary mobile device 500 capable of transmitting NFC-related and/or other close range communication transmissions. The mobile device 500 may include a processor 502, a memory 504, a speaker and/or microphone 506, a power supply 508, a LTE (Long Term Evolution) wireless radio frequency transmitter and/or receiver 510, a WiFi wireless radio frequency transmitter and/or receiver 512, and multiple spatially-separated antennas and/or transmitters 514, 516, 518, 520, and 522. The multiple spatially-separated antennas and/or transmitters 514, 516, 518, 520, and 522 may be NFC-enabled. The mobile device 500 may include additional or fewer NFC-enabled spatially-separated antennas and/or transmitters. The mobile device 500 may include additional, different, or fewer components.

As shown in FIG. 5, the plurality of NFC-enabled spatially-separated paced antennas and/or transmitters 514, 516, 518, 520, and 522 may be mounted on the mobile device 500. A transmission of a complete message from the mobile device 500 to a receiving device may be performed in parts or portions by random alteration or operation of individual NFC-enabled antennas and/or transmitters 514, 516, 518, 520, and 522 from among the plurality of NFC-enabled spatially-separated antennas and/or transmitters 514, 516, 518, 520, and 522, respectively, mounted on the mobile device 500. The individual NFC-enabled antennas and/or transmitters 514, 516, 518, 520, and 522 may be activated in turn (i.e., individually and/or sequentially, or one at time) such that a spatial movement among the individual NFC-enabled antennas and/or transmitters 514, 516, 518, 520, and 522 transmitting is simulated and secure transmission of the complete signal is enhanced. Each portion of the transmission that is transmitted from a different one of the plurality of NFC-enabled spatially-separated paced antennas and/or transmitters 514, 516, 518, 520, and 522 may be transmitted at a different level or value of a signal characteristic than the one or more adjacent-in-time (previous and/or subsequent) portions of the transmission.

In the case of a transmission from a purchaser mobile device and a merchant computing device via a number of NFC channels, once all of the portions of the entire transmission have been transmitted from the purchaser mobile device to the merchant computing device, the financial transaction between the purchaser and the merchant may be completed (such as in return for purchasing a product, monies from a financial account of the purchaser may be electronically transferred to the merchant). Continuously changing which antenna/transmitter is transmitting, and/or continuously changing at which power level or other signal characteristic that the signal is being transmitted at, may reduce or continuously change the capability of an eavesdropping to lock into the phase and/or magnitude of the signal and inhibit the ability to decode the sniffed signal. Which antenna/transmitter and what power level (or other signal characteristic setting) is associated with a signal/message portion may be randomly determined or otherwise altered.

In another embodiment, the mobile device 500 may be configured to or capable of dynamically changing the individual NFC channels, and/or characteristics thereof, associated with a complete NFC transmission. The mobile device 500 may include a plurality of NFC-enabled transmitting means; means for dividing a complete transmission required to execute a financial-related transmission or other data exchange into transmission portions; means for randomly assigning each sequential transmission portion to one of the NFC-enabled transmitting means that is different than the NFC-enabled transmitting means that an adjacent-in-time (either preceding or subsequent, or both) or adjacent-in-space (adjacent communication channel) transmission portion was assigned to; and means for randomly selecting a value or setting of a signal characteristic of each transmission portion that is different than the value or setting of the signal characteristic of the adjacent-in-time (either preceding or subsequent, or both) or adjacent-in-space transmission portion. Each of the plurality of NFC-enabled transmitting means may include an antenna and/or transmitter, such as the NFC-enabled antennas and/or transmitters 514, 516, 518, 520, and 522 shown in FIG. 5. Each individual transmission portion may be sequentially and/or simultaneously transmitted from the randomly assigned different NFC-enabled transmitting means and/or at the randomly assigned different values or settings of the signal characteristic to inhibit eavesdropping. The "means for dividing . . . ", "means for randomly assigning . . . ", and/or "means for randomly selecting . . . " discussed above may include a processor 502 programmed to perform the respective functionality and/or computer instructions stored on a non-transitory memory unit 504 that relate to instructing the processor 502 to perform the respective functionality.

IV. Exemplary Methods

The present embodiments provide a method of dynamically changing the individual close range communication, such as NFC, channels, and/or characteristics thereof, associated with a complete close range communication transmission between wireless communication devices. The method may include (a) generating a close range communication transmission having a number of transmission portions and/or dividing a close range communication transmission into a number of transmission portions at a transmitting device; (b) transmitting an initial transmission portion from the transmitting device (1) from a first antenna and/or transmitter that is mounted on the transmitting device, and/or (2) at a first level or setting of a signal characteristic; and/or (c) transmitting a second transmission portion from the transmitting device (3) from a second antenna and/or transmitter that is mounted on the transmitting device, the second antenna and/or transmitter being spatially-separated from the first antenna and/or transmitter, and (4) at a second level or setting of the signal characteristic, the second level or setting being different than the first level or setting.

The method may further include transmitting each subsequent transmission portion from the transmitting device from a next antenna and/or transmitter that is mounted on the transmitting device and that is different than the antenna and/or transmitter used to transmit the directly preceding transmission portion that was transmitted from the transmitting device. The method may further include transmitting each subsequent transmission portion from the transmitting device at a level or setting of the signal characteristic that is different from that of the directly preceding transmission portion. The signal characteristic that is varied from transmission portion to transmission portion may be power level, phase, or other signal characteristic discussed herein. The first and second transmission portions may be transmitted simultaneously or sequentially.

Figure 6:
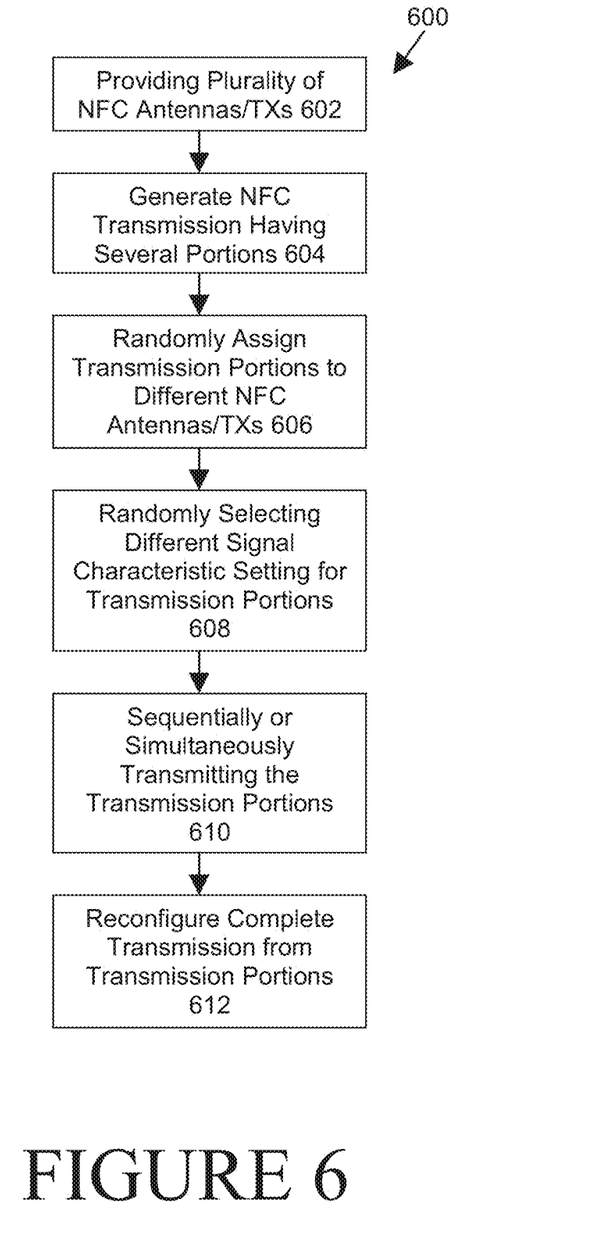
FIG. 6 illustrates an exemplary method of dynamically changing the characteristics of individual NFC channels between computing devices.

FIG. 6 illustrates an exemplary method of dynamically changing the characteristics of individual NYC channels between computing devices (such as between a purchaser mobile device and a merchant computing device) 600. The method 600 may include providing a plurality of NFC-enabled antennas and/or transmitters on the purchaser mobile device 602, generating a transmission having several transmission portions 604, such as dividing a complete transmission required to execute a financial transmission into transmission portions, randomly assigning each sequential transmission portion to a different antenna (and/or transmitter) than the antenna (and/or transmitter) that the preceding, subsequent, or adjacent transmission portion was assigned to 606; randomly selecting a different signal or waveform characteristic setting of the transmission portion that is different than the setting of the signal or waveform characteristic of the preceding, subsequent, or adjacent transmission portion (amplitude or power level, phase, frequency, transmission time or length, etc.) 608; and transmitting the transmission portions sequentially and/or simultaneously from different antennas (and/or transmitters) and at different signal characteristic settings 610 to inhibit eavesdropping. The method may further include, at the receiving device, such as merchant computing device, reconfiguring the complete transmission from the multiple transmission portions received 612 and/or then complete a data exchange, download, or other operation. The method may include additional, fewer, or alternate actions.

Figure 7:
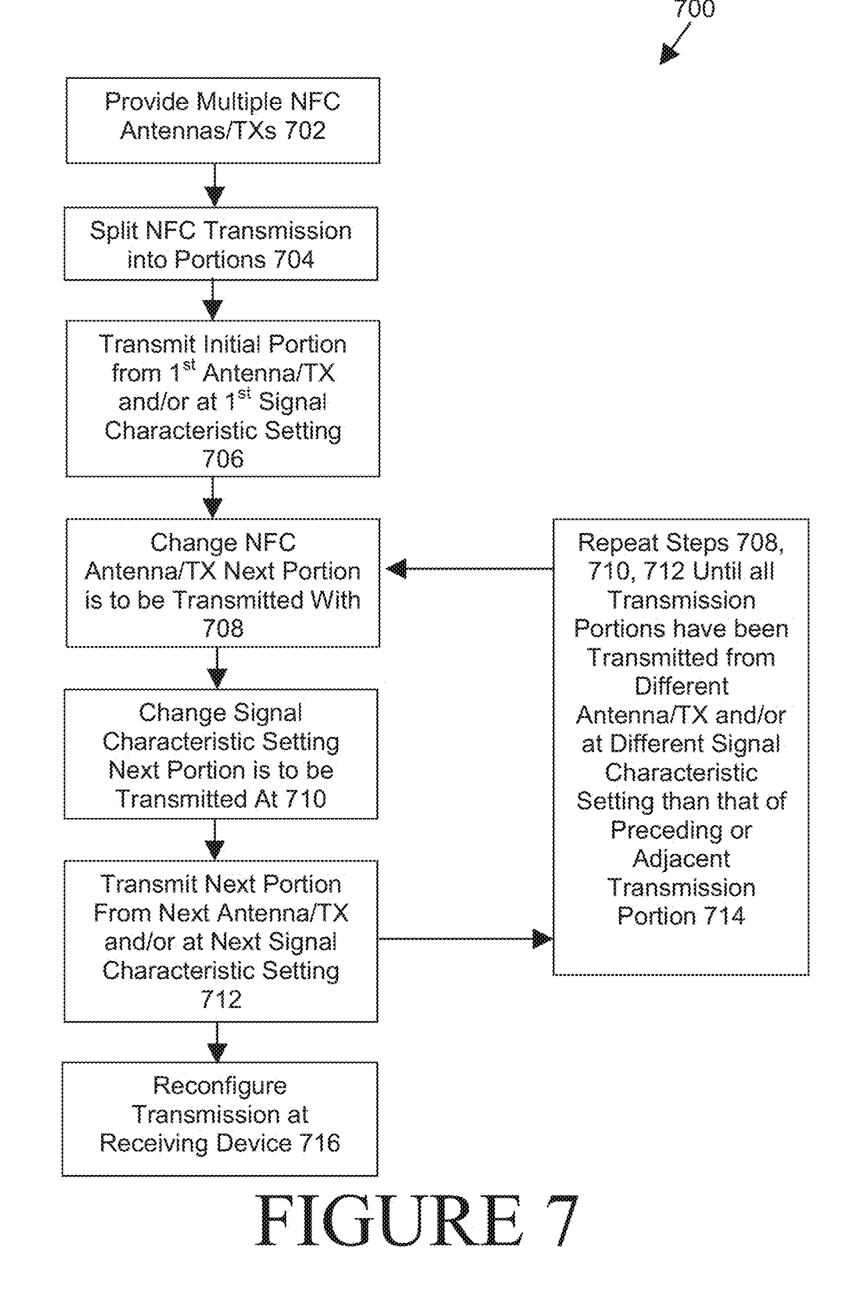
FIG. 7 illustrates an exemplary method of dynamically (a) adjusting the characteristics of individual portions of an entire NFC transmission, and/or (b) changing NFC communication channels to facilitate secure NFC between wireless communication devices.

FIG. 7 illustrates an exemplary method of dynamically adjusting the characteristics of individual portions of an entire NFC transmission and/or changing NFC communication channels to facilitate secure NFC between wireless communication devices 700. The method 700 may include (a) providing a plurality of NFC-enabled antennas and/or transmitters on the purchaser mobile device 702; (b) breaking a NFC financial-related transmission or other data exchange message into a number of portions 704; (c) transmitting an initial portion of the transmission (i) from a first antenna/transmitter of a mobile device, and/or (ii) at one or more first signal characteristic (amplitude, power level, frequency, data length, transmission portion length or time, modulation technique, network protocol, encryption technique, etc.) 706 signal(s); (d) randomly altering or changing the antenna/transmitter that a next portion of the transmission is transmitted from (as compared to the previous portion) 708; (e) randomly altering or changing one or more signal characteristic settings at which the next portion of the transmission is transmitted (as compared to the previous portion) 710; (f) transmitting the next portion from the randomly selected antenna/transmitter and/or at the randomly selected signal characteristic setting(s) 712; and/or (g) repeating steps (d), (e), and (f) 714 until the entire transmission is completed, and at which time the transmission may be reconfigured or translated at a receiving device 716. As a result, each sequentially and/or individually transmitted portion may be transmitted from a different antenna/transmitter and/or at a different signal characteristic setting than the adjacent (i.e., preceding and/or subsequent) portion(s). Thus, the financial transaction or other data exchange may be facilitated between a mobile device and merchant or other party's wireless communication device, and eavesdropping of the financial transaction or other data exchange may be prevented, hindered, or inhibited. The method may include additional, fewer, or alternate actions.

Figure 8:
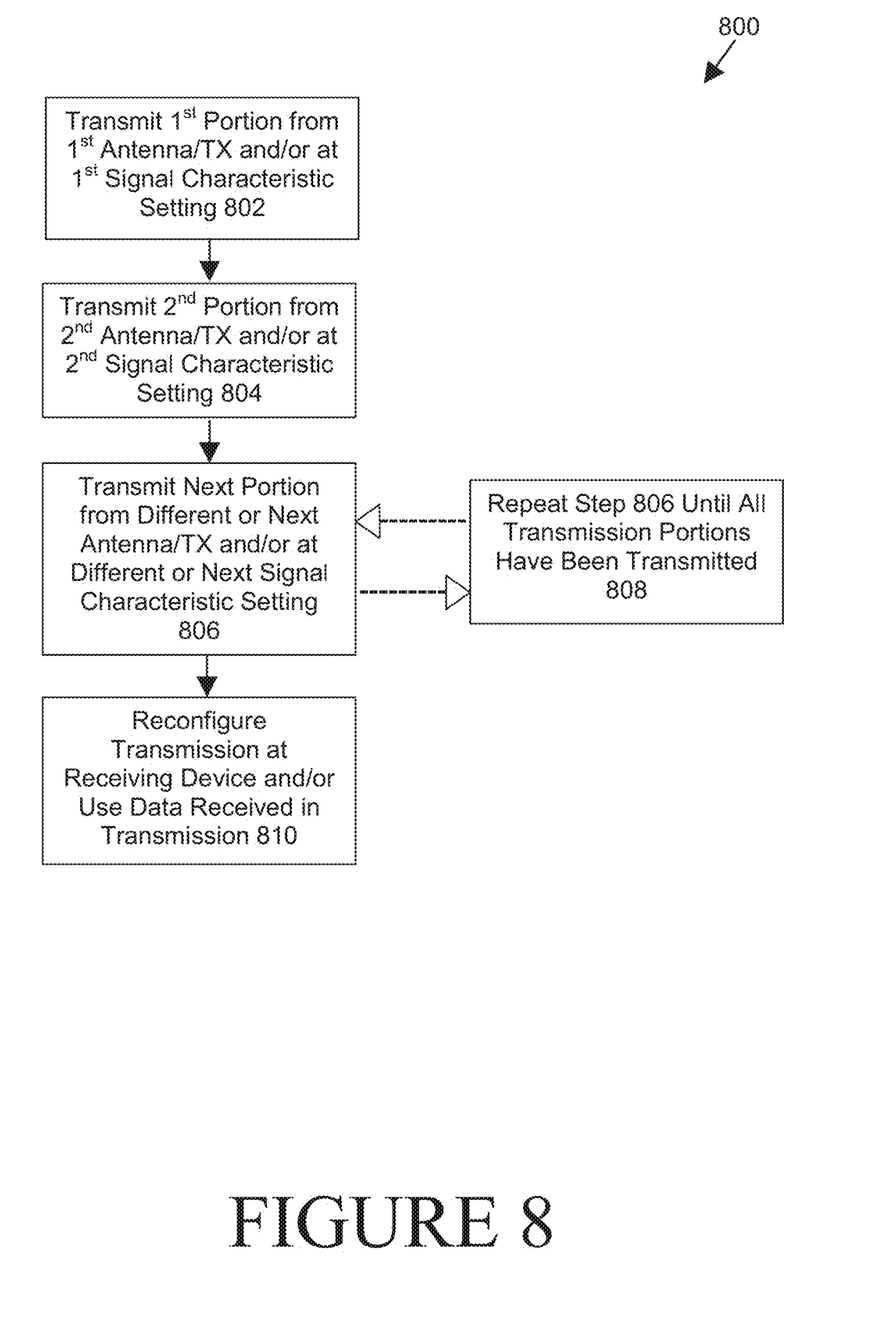
FIG. 8 illustrates another exemplary method of dynamically (a) adjusting the characteristics of individual portions of an entire NFC transmission, and/or (b) changing NFC communication channels to facilitate secure NFC between wireless communication devices.

FIG. 8 illustrates another exemplary method of dynamically adjusting the characteristics of individual portions of an entire NFC transmission and/or changing NFC communication channels to facilitate secure NFC between wireless communication devices 800. The method may include transmitting a first portion of a financial-related transmission from a purchaser mobile device to a merchant computing or wireless communication device (a) from a first antenna/transmitter on the purchaser mobile device, and/or (b) at a first level or setting of a signal characteristic (power level, magnitude, frequency, data length, period of time of transmission/transmission portion length, encryption technique, modulation technique, etc.) 802. The method may include transmitting a second portion of the financial-related transmission (c) from a second antenna/transmitter on the purchaser mobile device, and/or (d) at a second level or setting of the signal characteristic, the second antenna/transmitter being different from the first antenna/transmitter and/or the second level or setting of the signal characteristic may be different from the first level or setting of the signal characteristic 804. The method may include transmitting a next (i.e, third, fourth, fifth, etc.) portion of the financial-related transmission (e) from a next antenna/transmitter on the purchaser mobile device, and/or (f) at a next level or setting of the signal characteristic, the next antenna/transmitter being different from the previous antenna/transmitter and the next level or setting of the signal characteristic may be different from the previous level or setting of the signal characteristic 808. The method may continue transmitting next portions of the financial-related transmission as in step 806 until the entire transmission has been transmitted. After the complete transmission is received, the merchant device may complete a financial transaction and/or otherwise use the data received in the transmission 810. The next antenna/transmitter and/or next level or setting of the signal characteristic (from which and at which, respectively, the next portion is to be transmitted) may be randomly determined or pre-determined. The method may include additional, fewer, or alternate actions.

In yet another embodiment, the method may include transmitting a financial-related or other transmission in a number of portions. Each portion of the complete transmission that is sequentially and/or individually transmitted may be transmitted (1) from a different antenna that is different than the antenna that an adjacent-in-time (previous and/or subsequent) and/or adjacent-in-space (i.e., signals simultaneously transmitted using spatially adjacent NFC communication channels) transmitted portion is transmitted from, and/or (2) at or having a different signal characteristic setting that is different than the signal characteristic setting that the adjacent-in-time or adjacent in-space transmitted portion is transmitted at or having (e.g., at a different power level, phase, frequency, etc).

Additionally or alternatively, the method may include receiving a financial-related or other transmission in a number of portions at a wireless communication device (such as at a mobile device or a merchant computing device). Each portion of the complete transmission that is sequentially and/or individually received may be received (1) from a different antenna that is different from the antenna that an adjacent-in-time (previous and/or subsequent) and/or adjacent-in-space received portion is received from, and/or (2) at or having a different signal characteristic setting than the signal characteristic setting that the adjacent-in-time and/or adjacent-in-space transmitted portion is transmitted at or having. As a result, eavesdropping may be inhibited, and once the entire transmission is received, a wireless communication between devices may be securely completed, such as a communication involving financial information, or video, audio, email, text, and/or other types of data exchanges. Also, alignment of NFC antennas and/or transmitters with receivers on a receiving device may be easier than with single NFC antenna devices.

Although the above embodiments may discuss using the present embodiments with NFC, other close range wireless communication techniques and technologies may be used. For instance, other communication techniques using magnetic fields may be employed. The "range" of the wireless communication may be dependent upon the application in use and/or the type of magnetic field used to exchange data.

While the preferred embodiments of the invention have been described, it should be understood that the invention is not so limited and modifications may be made without departing from the invention. The scope of the invention is defined by the appended claims, and all devices that come within the meaning of the claims, either literally or by equivalence, are intended to be embraced therein.

It is therefore intended that the foregoing detailed description be regarded as illustrative rather than limiting, and that it be understood that it is the following claims, including all equivalents, that are intended to define the spirit and scope of this invention.

What is claimed is:

1. A mobile device capable of facilitating a financial transaction or other data exchange using close range communication, the mobile device comprising:
multiple antennas mounted on the mobile device, wherein a transmission of a message that includes encoded data for the financial transaction or other data exchange from the mobile device to a receiving device comprises:
partitioning the message into a plurality of portions; and
transmitting the plurality of portions of the message, each portion is transmitted using one of a plurality of signals from the mobile device to the receiving device via the multiple antennas, wherein each portion is transmitted (1) from a different antenna from among the multiple antennas, and (2) with a different signal characteristic, respectively, to facilitate completing the financial transaction or other data exchange in a secure manner.

2. The mobile device of claim 1, wherein the different signal characteristic at which the plurality of signals are transmitted is a different power level, and the close range communication is Near Field Communication ("NFC").

3. The mobile device of claim 1, wherein the different signal characteristic at which the plurality of signals are transmitted is a different phase.

4. The mobile device of claim 1, wherein the different signal characteristic at which the plurality of signals are transmitted is a different timing-related parameter.

5. The mobile device of claim 1, wherein the different signal characteristic at which the plurality of signals are transmitted is a different frequency.

6. The mobile device of claim 1, wherein the different signal characteristic at which the plurality of signals are transmitted is a different data-related parameter.

7. The mobile device of claim 1, wherein the plurality of signals are transmitted from different antennas one at a time.

8. The mobile device of claim 1, wherein the plurality of signals are transmitted from different antennas simultaneously.

9. A mobile device capable of facilitating a financial transaction or other data exchange using close range communication, the mobile device comprising:
a plurality of spatially-separated antennas mounted on the mobile device, wherein a transmission of a message, from the mobile device to a receiving device, that comprises encoded data for the financial transaction or other data exchange is performed in parts by: partitioning the message into a plurality of portions, and random operation of individual antennas from among the plurality of spatially-separated antennas mounted on the mobile device that are activated in turn, each of the plurality of spatially-separated antennas transmitting a different portion of the message, and wherein each portion is transmitted with a different signal characteristic.

10. The mobile device of claim 9, wherein each portion of the message that is transmitted from one of the plurality of spatially-separated antennas is transmitted at a different power level than at least one adjacent-in-time portion of the transmission.

11. The mobile device of claim 9, wherein the at least one signal characteristic is a power level, and the close range communication is Near Field Communication ("NFC").

12. The mobile device of claim 9, wherein the at least one signal characteristic is a phase.

13. A method of Near Field Communication (NFC), the method comprising:
partitioning a message that includes encoded data for a financial transaction or other data exchange into a plurality of transmission portions, wherein the plurality of transmission portions includes an initial transmission portion and a second transmission portion that is different than the initial transmission portion; and
generating a NFC transmission for the message at a transmitting device, wherein the generating the NFC transmission comprises:
transmitting an initial transmission portion from the transmitting device to a receiving device (1) from a first antenna that is mounted on the transmitting device, and (2) with a first signal characteristic; and
transmitting a second transmission portion from the transmitting device to the receiving device (3) from a second antenna that is mounted on the transmitting device, the second antenna being spatially-separated from the first antenna, and (4) with at a second signal characteristic, the second signal characteristic being different than the first signal characteristic.

14. The method of claim 13, the method further comprising:
transmitting each subsequent transmission portion from the transmitting device from a next antenna that is mounted on the transmitting device and that is different than the antenna used to transmit the directly preceding transmission portion that was transmitted from the transmitting device, wherein the next antenna is randomly determined.

15. The method of claim 14, the method further comprising:
transmitting each subsequent transmission portion from the transmitting device with a signal characteristic that is different from that of the directly preceding transmission portion.

16. The method of claim 13, wherein the signal characteristic that is changed from transmission portion to transmission portion is a power level.

17. The method of claim 13, wherein the signal characteristic that is changed from transmission portion to transmission portion is a phase.

18. The method of claim 13, wherein the first and second transmission portions are transmitted from different antennas simultaneously.

19. The method of claim 13, wherein the first and second transmission portions are transmitted from different antennas sequentially in time.

* * * * *